United States Patent Office 3,326,901
Patented June 20, 1967

3,326,901
PREGNENOLONE SALTS OF ALLANTOIN
Irwin I. Lubowe, 667 Madison Ave.,
New York, N.Y. 10027
No Drawing. Filed Apr. 16, 1965, Ser. No. 448,834
1 Claim. (Cl. 260—239.5)

This invention relates to new combination of matter and, more particularly, to a novel pregnenolone salt of allantoin and methods of making said salt. Allantoin pregnenolone is useful for prevention and treatment of the aging skin as a non-hormonal compound. Said compound may also be used as an anti-irritant and as a moisturizing and skin hydrating product.

Allantoin is a nitrogen-containing compound having the formula:

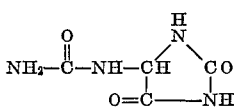

One of the compounds of the present invention comprises allantoin pregnenolone acetate having the following structural formula:

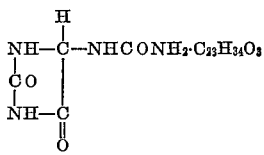

(1) One mode of preparing allantoin pregnenolone acetate comprises thoroughly mixing 36 grams of pregnenolone acetate with 16 grams of allantoin. Fifteen cc. of boiling alcohol is immediately added to this mixture, whereupon trituration is continued until an almost dry mass is achieved. Thereafter, the mixture is placed upon a tray and dried at between 150° F. to 160° F. for approximately two to four hours.

(II) Another mode of preparing allantoin pregnenolone acetate is substantially identical with the Example I above except that 5 cc. of boiling, distilled water is substituted for the boiling alcohol.

(III) A still further mode of preparing allantoin pregnenolone acetate comprises dissolving 36 grams of pregnenolone acetate in 2000 cc. of warm alcohol. To this solution is added 16 grams of allantoin previously dissolved in 200 cc. of boiling water. The composite solution is mixed thoroughly and then evaporated on a water bath to a volume of approximately 500 cc. Thereafter, the material is cooled to 32° F. for several hours, after which the precipitate is filtered and dried at approximately 160° F. for about 6 to 8 hours.

The resulting composition achieved by the foregoing modes of preparation comprises an approximate analysis, as follows:

|  | Percent |
|---|---|
| Pregnenolone acetate | 69 |
| Allantoin | 31 |

The solubility of allantoin pregnenolone acetate is .05% in an alcohol-water mixture and approximately .01% in water.

In all of the foregoing compositions and methods of making the same, pregnenolone succinate may be substituted for pregnenolone acetate whereby the solubility of the resulting compounds will be increased.

The foregoing detailed description has been given for clearness of understanding only and no unnecessary limitations are to be understood therefrom. The invention is not limited to the exact details shown and described, for obvious modifications will occur to those skilled in the art.

What is claimed is:
Allantoin pregnenolone acetate.

References Cited
UNITED STATES PATENTS
3,107,252  10/1963  Lubowe _____ 260—309.5

LEWIS GOTTS, Primary Examiner.
ELBERT L. ROBERTS, Examiner.
HENRY A. FRENCH, Assistant Examiner.